United States Patent
Halim et al.

(10) Patent No.: US 10,375,776 B2
(45) Date of Patent: Aug. 6, 2019

(54) MODULATED QUASI-RESONANT PEAK-CURRENT-MODE CONTROL

(71) Applicant: Infineon Technologies AG, Neubiberg (DE)

(72) Inventors: Andriyanto Halim, Singapore (SG); Kai Hong Cheong, Johor Bahru (MY); Muhammad Nur Syafii Bin Mohamed Saat, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 91 days.

(21) Appl. No.: 15/365,095

(22) Filed: Nov. 30, 2016

(65) Prior Publication Data
US 2018/0153013 A1    May 31, 2018

(51) Int. Cl.
*H05B 33/08* (2006.01)
*H02M 3/156* (2006.01)

(52) U.S. Cl.
CPC ........ *H05B 33/0815* (2013.01); *H02M 3/156* (2013.01); *Y02B 70/1425* (2013.01)

(58) Field of Classification Search
CPC ............ H05B 33/0815; H05B 33/0845; H05B 33/0818; H05B 33/0842; H05B 37/02; H05B 33/0809; H05B 33/0824; H05B 33/0854; H05B 33/0827; H05B 33/0851; H05B 33/086; H05B 33/0884; H05B 33/0887; H05B 33/089; H05B 41/28; H05B 41/2858
See application file for complete search history.

(56) References Cited

U.S. PATENT DOCUMENTS

| | | | |
|---|---|---|---|
| 6,586,890 B2 | 7/2003 | Min et al. | |
| 8,866,655 B2 | 10/2014 | Tomasovics et al. | |
| 9,055,632 B2 | 6/2015 | Tomasovics et al. | |
| 2006/0113922 A1* | 6/2006 | Ribarich | H05B 41/2882 315/209 R |
| 2012/0074860 A1* | 3/2012 | Lee | H03K 4/501 315/240 |

OTHER PUBLICATIONS

"Quasi-resonant control with XMC1000." AN_201606_PL30_020. Infineon. Jun. 20, 2016. 18 pages.

* cited by examiner

*Primary Examiner* — Tung X Le
*Assistant Examiner* — Borna Alaeddini
(74) *Attorney, Agent, or Firm* — Eschweiler & Potashnik, LLC

(57) ABSTRACT

Driver circuitry is configured to generate a control signal for a switching device that controls supply of load current to a load. The driver circuitry includes current control circuitry, modulation circuitry, and signal generation circuitry. The current control circuitry is configured to generate a current signal indicative of whether the load current has reached a reference current. The modulation circuitry is configured to generate a modulation signal having an ON-time that is based at least on a desired amount of current to be supplied to the load. The signal generation circuitry is configured to generate the control signal based at least on the current signal and the modulation signal.

19 Claims, 8 Drawing Sheets

//www.w3.org/1999/xhtml">
MODULATED QUASI-RESONANT PEAK-CURRENT-MODE CONTROL

FIELD

The present disclosure relates to the field of driver signal control and in particular to a methods and circuitry for controlling current supplied to a light emitting diode (LED).

BACKGROUND

With the proliferation of LED lamps, there are many applications which include dimming the lamps. Thus, it is often desirable for LED lamps to be dimmable (i.e., have an adjustable brightness). In some applications, LED drivers include switch-mode drivers that are used to control the current supplied to the LED. In such setups, the average current, and therefore the brightness of the lamp, can be controlled based on receiving a control signal at the switch input to the switch-mode driver.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

For the purposes of this description, various aspects will be described in the context of a driver circuit that is controlling current supplied to an LED lamp. It is to be recognized that the methods and circuitries described herein are equally applicable to driver circuits that control current supplied to any type of load. Thus, when the term LED or LED lamp is used, it is being used as an example load, and is not meant to limit the scope of the disclosure in any way.

Switch-mode LED driver circuits control the brightness of an LED lamp by controlling a switching device to adjust the amount of current being supplied to the LED. In general, the lower the average current being supplied to the LED, the dimmer the lamp will be. Some switch-mode driver circuits operate a switching device to supply a continuous flow of current having a desired average value to the LED. However, this mode of operation results in relatively low efficiency due to high losses during hard switching (i.e., switching at a relatively high drain-source voltage ($V_{DS}$)) of the switching device.

To address the problem of hard switching, some switch-mode driver circuits operate in a fixed frequency discontinuous conduction mode (DCM) in which the flow of current to the LED is discontinuous. In fixed frequency DCM the switching device is switched OFF when a desired reference LED current is reached and remains off for a predetermined amount of time. In this manner the switching cycle has a fixed frequency. When the current to the LED reaches zero, $V_{DS}$ exhibits underdamped oscillation (e.g., exhibits a series of decreasing "peaks" and "valleys") behavior before reaching its steady state. Because in DCM the switching is not synchronized in any way to $V_{DS}$, relatively high losses may still be experienced when switching occurs at a high $V_{DS}$.

Quasi-resonant switching, often called "valley switching," is a variant of DCM in which the switching cycle is controlled such that the switching device is switched ON during a "valley" (i.e., low point) of $V_{DS}$. This valley-switching results in less switching loss than traditional DCM. The valley may be detected by a zero current detector (ZCD) that detects when the LED current reaches zero. To use quasi-resonant control to control the brightness of an LED lamp, the reference current (i.e., the point at which the switching device is switched OFF) is adjusted to be higher for a brighter lamp and lower for a dimmer lamp. This constant adjusting of the reference current results in a complex control scheme.

Systems, circuitries, and methods described herein utilize a modulation signal to gate quasi-resonant switching to perform current mode control of the brightness of an LED lamp. In one embodiment, an existing brightness color control unit is used to generate the modulation signal and to control the reference current. This allows for brightness control with minimal central processing unit (CPU) load.

Figure 1:
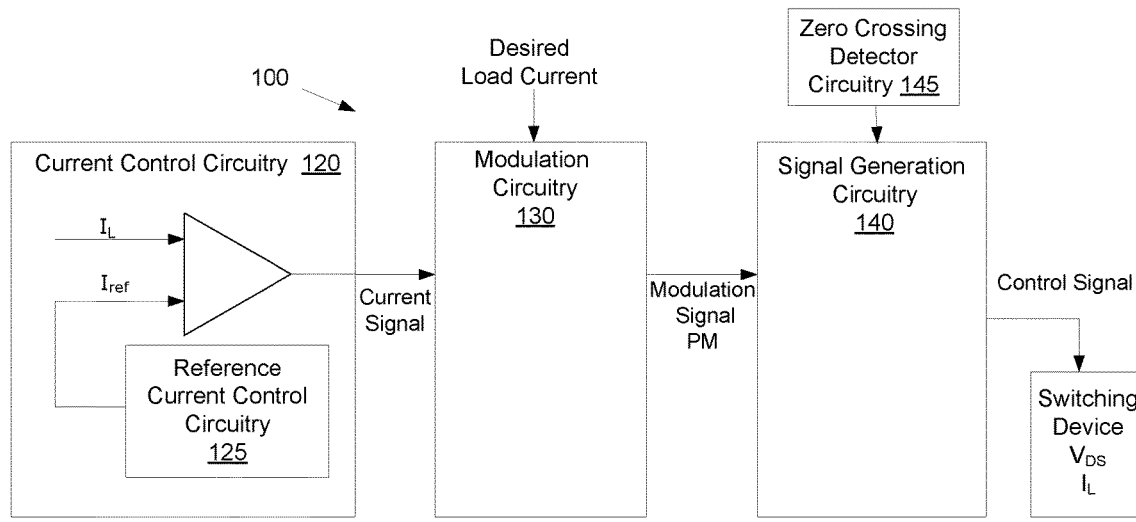
FIG. 1 illustrates one embodiment of a driver circuit that employs modulated quasi-resonant peak-current mode control.

FIG. 1 illustrates one embodiment of driver circuitry 100 configured to perform modulated quasi-resonant peak current control for a switching device. The driver circuitry 100 includes current control circuitry 120, modulation circuitry 130, and signal generation circuitry 140. The driver circuitry 100 generates a control signal that includes pulses that turn the switching device ON and OFF to generate a desired load current $I_L$. The load current is provided to a load (not shown) that may be, for example, an LED lamp. The amount of load current is controlled to control the brightness of the LED lamp.

The current control circuitry 120 is configured to perform a comparison between a reference current $I_{ref}$ and the load current $I_L$. When the load current reaches the reference current, the output of current control circuitry switches states. In one embodiment, the current control circuitry includes reference current control circuitry 125 that determines an appropriate reference current depending on various factors, as will be described in more detail with respect to FIG. 1E. The modulation circuitry 130 is configured to generate a modulation signal based on a desired load current, which correlates to a desired brightness in an LED lamp. The modulation signal has an ON-time that is proportional to the desired load current. The modulation signal is used to control valley switching and other aspects of control signal generation. The signal generation circuitry 140 is configured to generate the control signal based at least on the modulation signal and the current signal. In one embodiment, the driver circuitry 100 includes zero crossing circuitry 145 that detects when the load current reaches zero in order to determine the occurrence of a valley in $V_{DS}$.

Figure 1A:
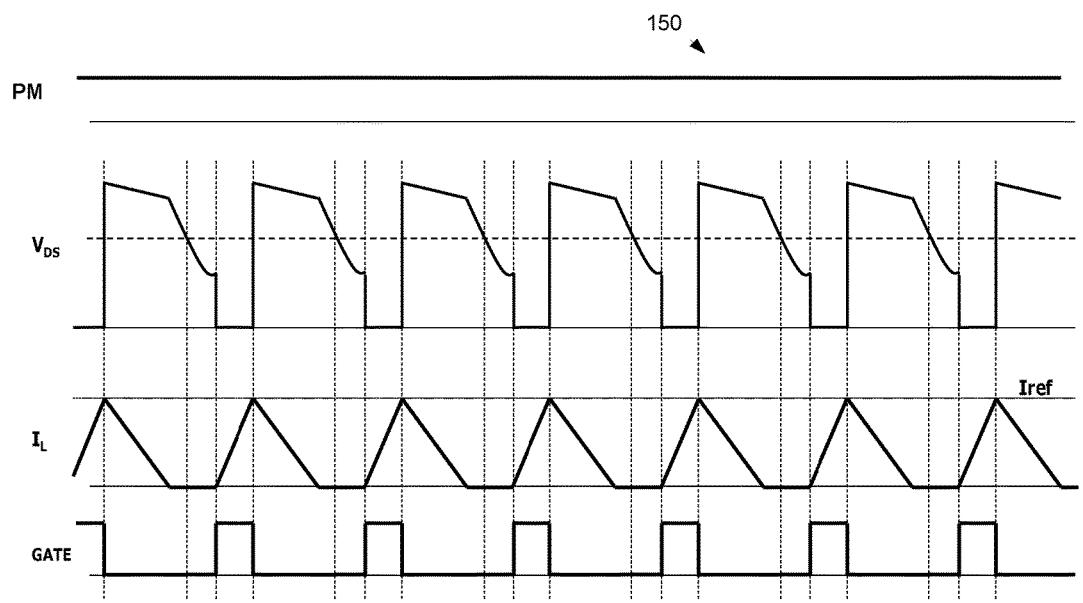
FIGS. 1A-1E illustrate timing diagrams of various signals within the driver circuit of FIG. 1 when the driver circuit is operated to generate various brightness levels for an LED lamp.

FIG. 1A illustrates various signals 150 within the driver circuitry 100 when the desired load current is at a maximum level to drive the LED lamp to a maximum brightness. The modulation signal PM remains at a constant high state, thus having an ON-time of 100%. The reference current is set to twice the LED lamp's rated current. When the PM signal is high, the signal generation circuitry 140 is configured to generate a control signal (the control signal is labeled GATE in all waveform figures herein because the control signal is provided to a MOSFET gate input) that will switch the switching device ON in a first valley of $V_{DS}$ and OFF when the reference current is reached.

Figure 1B:
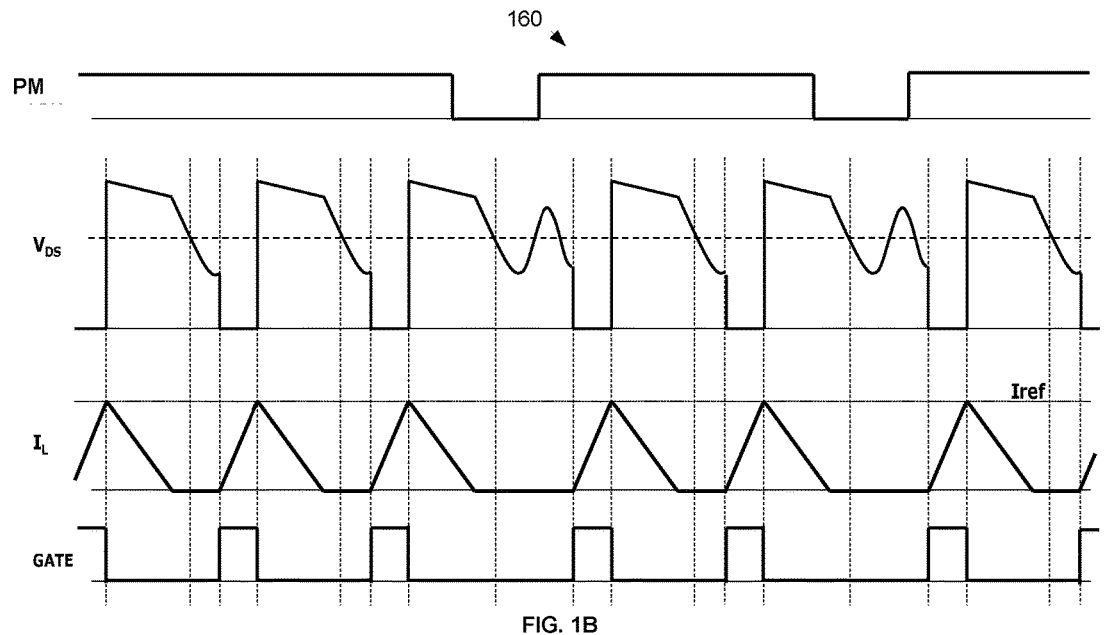

FIG. 1B illustrates various signals 160 within the driver circuitry 100 when the desired load current is at a medium level to drive the LED lamp to a medium brightness. The modulation signal PM has an ON-time of 75%. The reference current is set to twice the LED lamp's rated current. When less than maximum brightness is called for, the driver circuitry 100 performs "valley dithering" in which the switching device is not always switched ON in a first valley as in FIG. 1A, but rather in some instances one or more valleys are skipped as shown in FIG. 1B. It can be seen that the control signal GATE has pulse leading edges that occur only when PM is high. While PM is low, the valleys in VDS are skipped. Thus, by modulating the input to signal generation circuitry 140 the driver circuitry 100 is able to precisely control the amount of current delivered to the LED lamp. Note that no adjustment is made to the reference current. Valley dithering also introduces spread spectrum noise distribution for improved EMI.

Figure 1C:
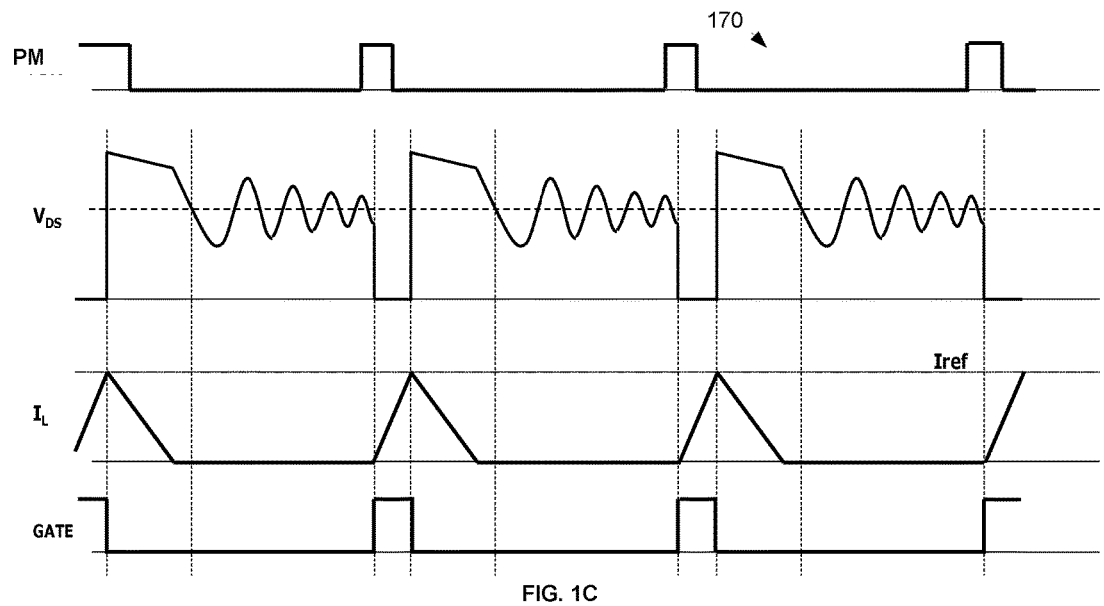

FIG. 1C illustrates various signals 170 within the driver circuitry 100 when the desired load current is at a low level to drive the LED lamp to a low level of brightness. The modulation signal PM has an ON-time of 10%. The reference current is set to twice the LED lamp's rated current. It can be seen that the multiple valleys are skipped and the frequency of the GATE signal has been significantly reduced, while the load current continues to reach the reference current on each cycle. As the frequency of the GATE signal falls, it is possible that visible flickering or audible noise may be produced by the driver circuit and/or LED lamp.

Figure 1D:
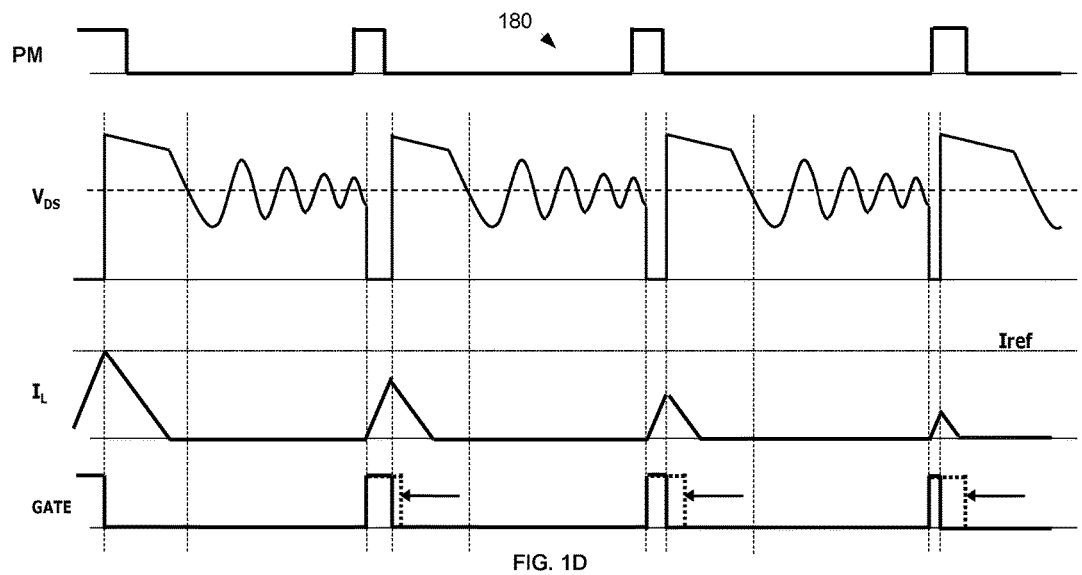

To address the potential issues with low switching frequency, the driver circuitry 100 is configured to provide a "valley clamp" that imposes an upper limit on a number of valleys that may be skipped thereby enforcing a lower limit on the frequency of the control signal. In one embodiment the lower limit is approximately 30 kHz. FIG. 1D illustrates various signals 180 within the driver circuitry 100 when the desired load current is even lower than the load current level in FIG. 1C, but in which the same number of valleys is skipped due to the valley clamp feature. Thus, at maximum dimming, the PM signal remains at the low limit of frequency. To reduce the load current to the low level to achieve maximum dimming without skipping additional valleys, the ON time or pulse width is shortened by the signal generation circuitry 140. Note that in all levels of desired brightness (FIGS. 1A-1D), valley switching is used so that switching losses and EMI are minimized.

Figure 1E:
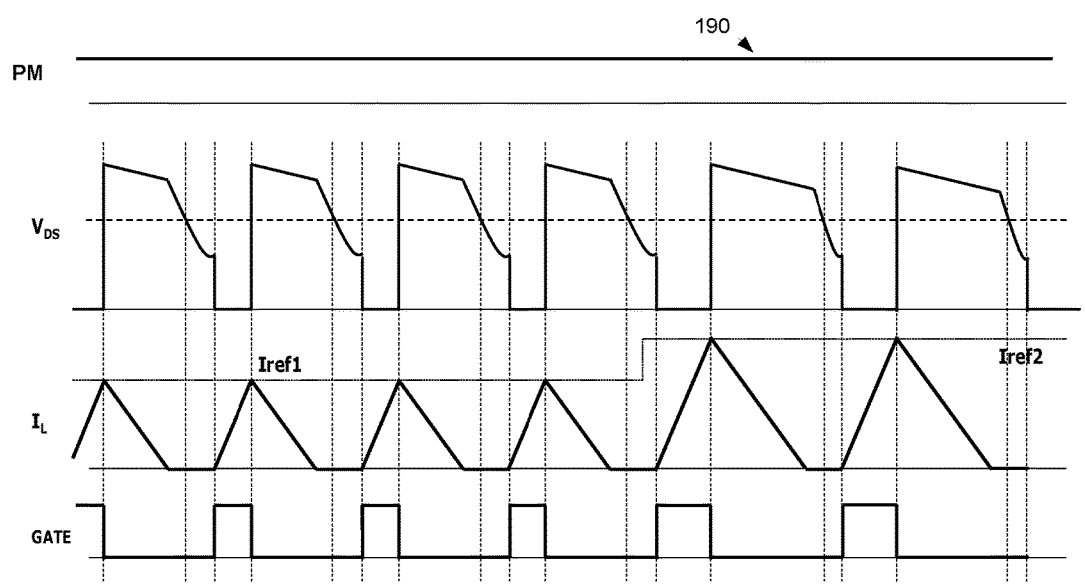

FIG. 1E illustrates various signals 190 within the driver circuitry 100 when the reference current is adjusted by the reference current control circuitry 125 from a first level Iref1 to a second level Iref2 based on some operating condition of the load (e.g., LED lamp). The reference current control circuitry 125 determines the reference current based on some operating parameter of the load, such as temperature or brightness. For example, the reference current control circuitry 125 may select a lower reference current when a temperature of the LED lamp or other component exceeds some threshold temperature. In this manner, overheating may be prevented. As the LED lamp ages, the amount of light produced by the LED lamp may be reduced. When the brightness of the LED lamp at maximum current falls below a threshold amount, the reference current control circuitry 125 may select a higher reference current to extend the life of the LED lamp.

Figure 2:
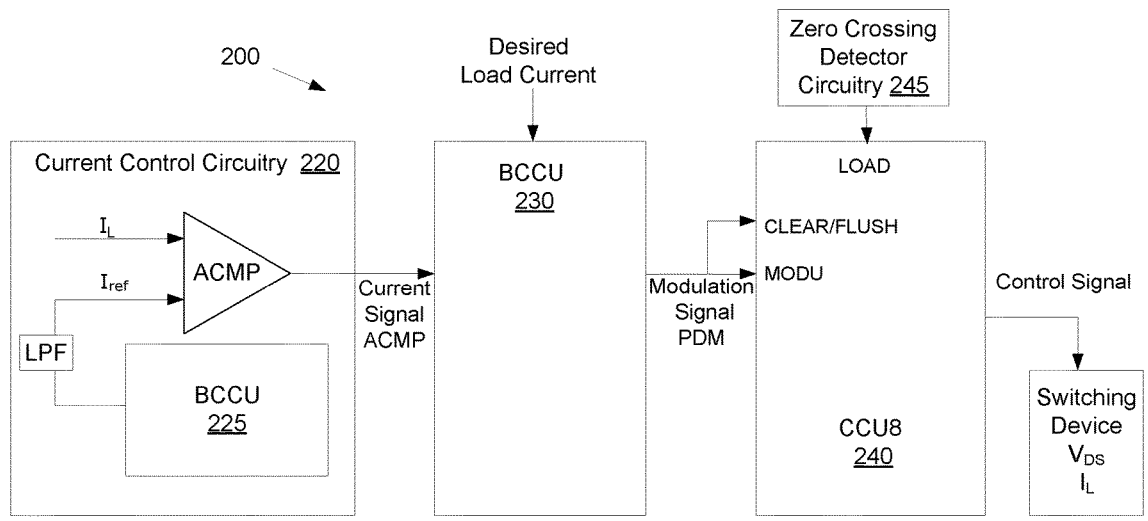
FIG. 2 illustrates one embodiment of a driver circuit that employs pulse-density modulated quasi-resonant peak-current mode control.

FIG. 2 illustrates one embodiment of driver circuitry 200 configured to perform modulated quasi-resonant peak current control for a switching device. The driver circuitry 200 generates a control signal that includes pulses that turn the switching device ON and OFF to generate a desired load current $I_L$. The load current is provided to a load (not shown) that may be, for example, an LED lamp. The amount of load current is controlled to control the brightness of the LED lamp. In the embodiment of FIG. 2, the pulse modulation signal is pulse density modulation (PDM) generated by brightness color control unit circuitry (BCCU) 230 and the control signal is generated by 8 bit capture and control unit circuitry (CCU8) 240. In this embodiment, the BCCU circuitry 230 is also used as reference current control circuitry (labeled BCCU 225) to generate a digital signal that defines the reference current, based on some parameter as discussed with respect to FIG. 1E.

Figure 2A:
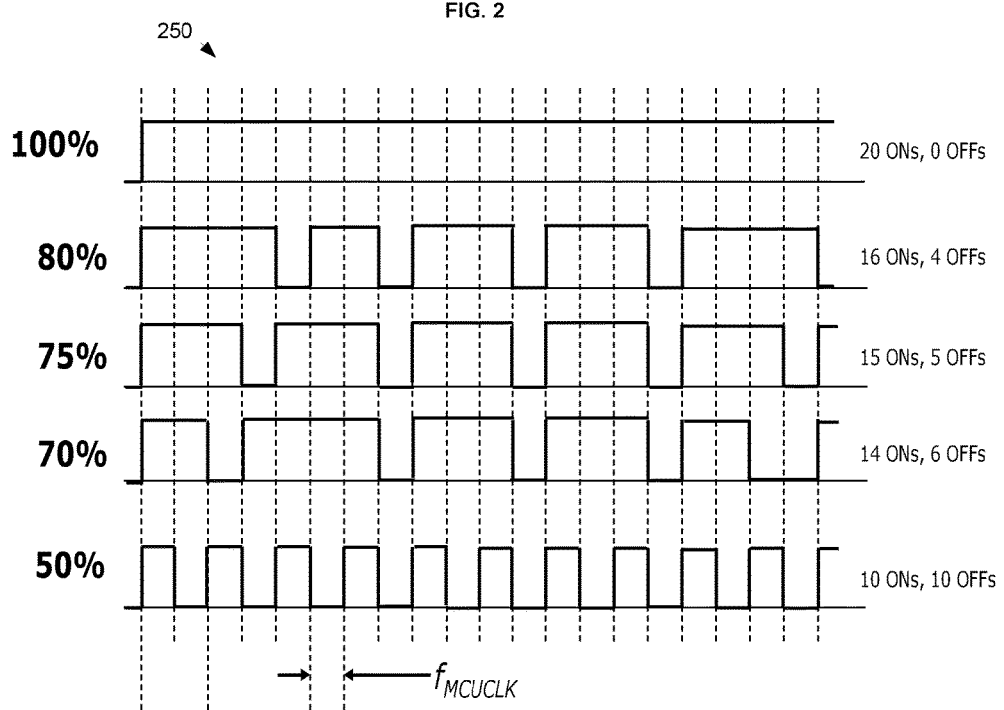
FIGS. 2A-2C illustrate timing diagrams of various signals within the driver circuit of FIG. 2 when the driver circuit is operated to generate various brightness levels for an LED lamp.

Current control circuitry 220 includes a low pass filter that processes the digital signal from the BCCU 225 so that it may be input to an analog comparator ACMP. ACMP compares the reference current to the load current and outputs signal labeled ACMP in the waveform diagrams, which switches state when the load current reaches the reference current. The BCCU 230 is configured to generate the PDM signal having an ON-time based on a desired level of brightness (or load current). FIG. 2A illustrated various PDM signals 250 having different ON-times as discussed in FIG. 1. The BCCU "packs bits" into a series of pulses having a desired ratio of ON pulses to OFF pulses as shown in FIG. 2A. The PDM signals are similar to the PM signals illustrated in FIGS. 1A-1D. In this manner, the PDM signal generated by the BCCU 230 controls dimming, valley skipping, and valley clamping as described with reference to FIG. 1.

Figure 2B:
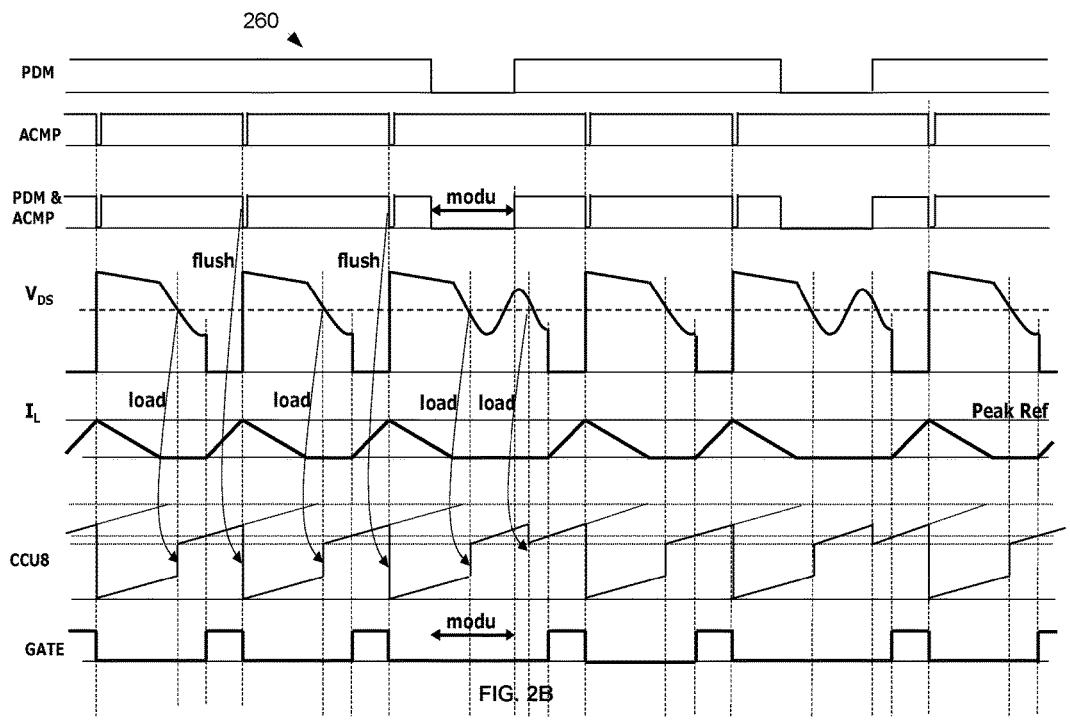
Figure 2C:
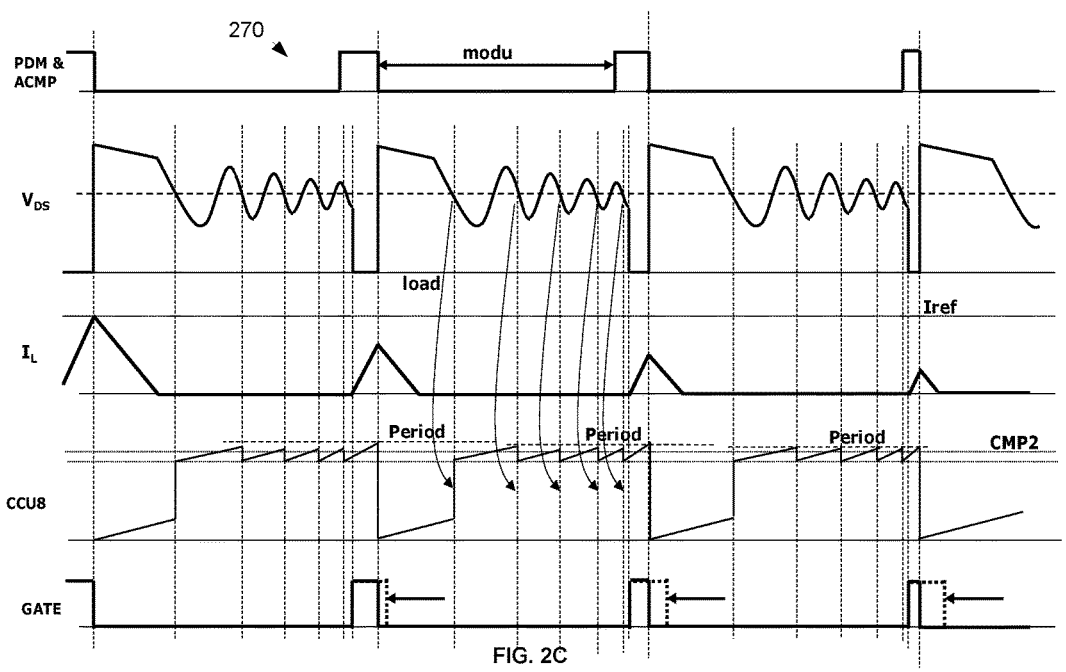

The CCU8 240 is controlled based on a CCU8 signal that is the result of a logical AND operation on the PDM signal generated by the BCCU 230 and the ACMP signal generated by the comparator ACMP. FIGS. 2B and 2C illustrate various signals within the driver circuitry 200. The CCU8 240 performs timer or counter functions based on three inputs: CLEAR, FLUSH, and LOAD. A FLUSH input causes the CCU8 to begin counting or timing at zero. The FLUSH input is triggered by a falling edge of the CCU8 signal (labeled PDM&ACMP in FIGS. 2B and 2C). The LOAD input causes some number of counts or time increments to be loaded or added to the CCU8's count or time. The LOAD input is triggered by the zero crossing detector 245 detecting a zero crossing of the load current (i.e., a valley is detected). The CCU8 240 generates a rising edge of the control signal when the count or time reaches some threshold amount and the CCU8 signal is also high. The CCU8 generates the falling edge of the control signal on each falling edge of the CCU8 signal. When the CCU8 reaches the threshold count and the CCU8 signal is not high (valley skipping) the counter or timer is cleared of a certain number (but not reset to zero as with a FLUSH input) and the counting or timing operation continues at the count or time that is the result of the LOAD operation.

FIG. 2C illustrates signal waveforms within the driver circuitry 200 when valley clamping is being performed to generate a very low brightness control signal by reducing the ON-time of the control signal while maintaining a minimum frequency of the control signal to avoid perceptible flickering or noise. The CCU8 240 is able to enforce a maximum period on the time between FLUSH operations and generates a falling edge of the control signal when the maximum period is reached, prior to a FLUSH input being triggered by virtue of a falling edge of the CCU8 signal.

The driver circuit 200 makes use of an existing BCCU and CCU8 to provide LED current control including peak current control, ON-time control, valley switching, valley skipping, temperature compensation. This means that very little CPU time is needed in driving the LED lamp.

Figure 3:
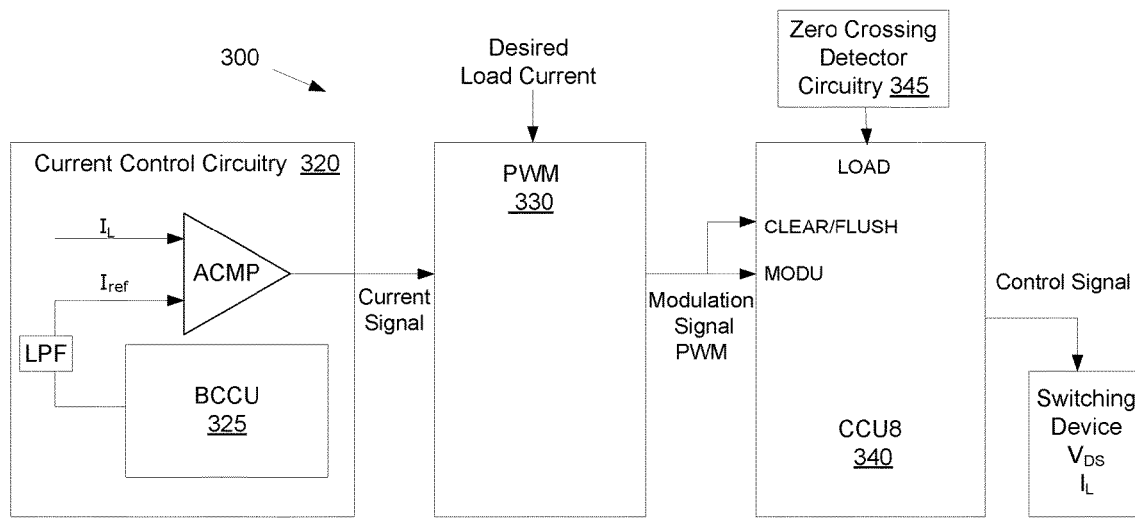
FIG. 3 illustrates one embodiment of a driver circuit that employs pulse-width modulated quasi-resonant peak-current mode control.

FIG. 3 illustrates one embodiment of driver circuitry 300 configured to perform modulated quasi-resonant peak current control for a switching device. The driver circuitry 300 includes current control circuitry 320, modulation circuitry 330, and signal generation circuitry 340. The driver circuitry 300 generates a control signal that includes pulses that turn the switching device ON and OFF to generate a desired load current $I_L$. The load current is provided to a load (not shown) that may be, for example, an LED lamp. The amount of load current is controlled to control the brightness of the LED lamp.

Figure 3A:
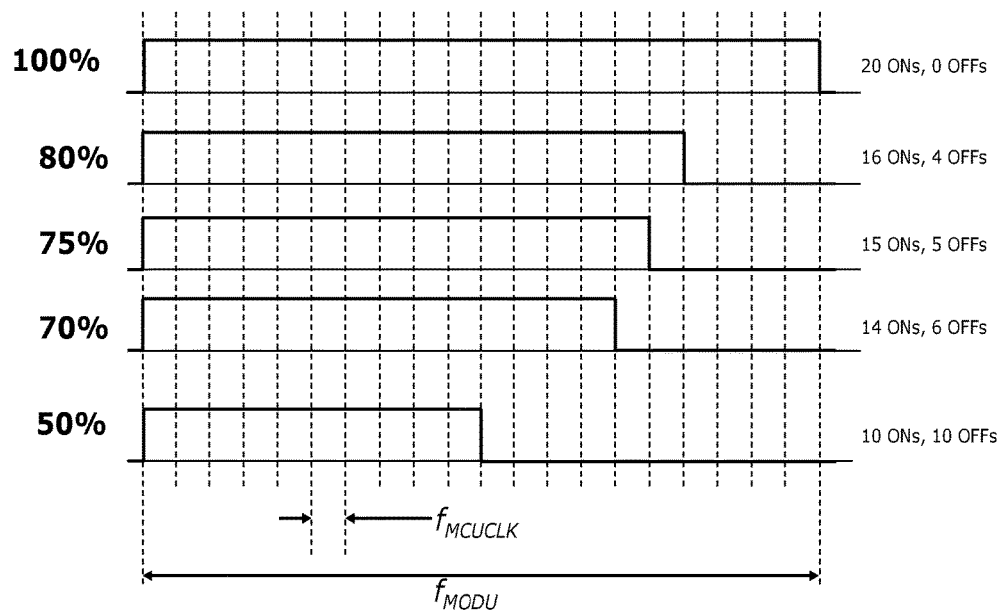
FIGS. 3A-3C illustrate timing diagrams of various signals within the driver circuit of FIG. 3 when the driver circuit is operated to generate various brightness levels for an LED lamp.

The current control circuitry 320 is configured to perform a comparison between a reference current $I_{ref}$ and the load current $I_L$. When the load current reaches the reference current, the output of current control circuitry switches states. In one embodiment, the current control circuitry includes reference current control circuitry 325 that determines an appropriate reference current depending on various factors, described with respect to FIG. 1E. The modulation circuitry 330 is configured to generate a pulse width modulation (PWM) signal based on a desired load current, which correlates to a desired brightness in an LED lamp. The modulation signal has an ON-time that is proportional to the desired load current. FIG. 3A illustrates PWM signals 350 having different ON-times. In general, the PWM signal controls a ratio of ON time to OFF time within a modulation period $1/f_{MODU}$. The PWM signal is used to control valley switching and other aspects of control signal generation. The signal generation circuitry 340 is configured to generate the control signal based at least on the PWM signal and the current signal. In one embodiment, the driver circuitry 300 includes zero crossing circuitry 345 that detects when the load current reaches zero in order to determine the occurrence of a valley in $V_{DS}$.

Figure 3B:
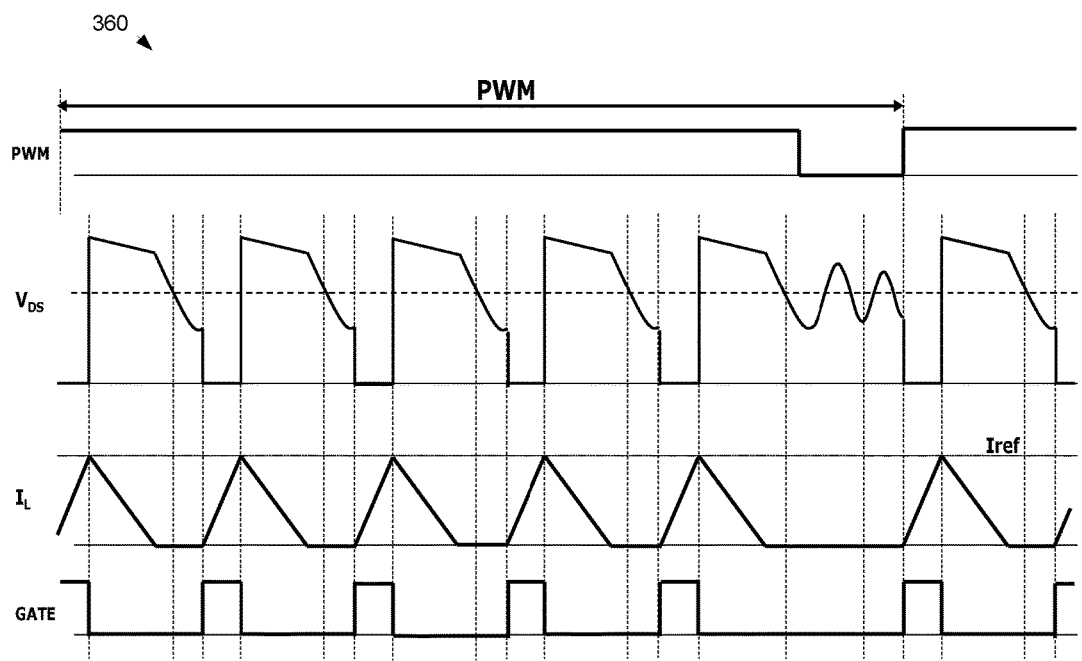

FIG. 3B illustrates various signals 360 within the driver circuitry 300 when the desired load current is at a medium level to drive the LED lamp to a medium brightness. The modulation signal PM has an ON-time of about 85%. The reference current is set to twice the LED lamp's rated current. When less than maximum brightness is called for, the driver circuitry 300 performs the "valley dithering" as described with reference to FIG. 1B. It can be seen that the control signal GATE has pulse leading edges that occur only when PWM is high. While PWM is low, valleys in $V_{DS}$ are skipped. Thus, by modulating the input to signal generation circuitry 340 the driver circuitry 300 able to precisely control the amount of current delivered to the LED lamp. Note that no adjustment is made to the reference current. Valley dithering also introduces spread spectrum noise distribution for improved EMI.

Figure 3C:
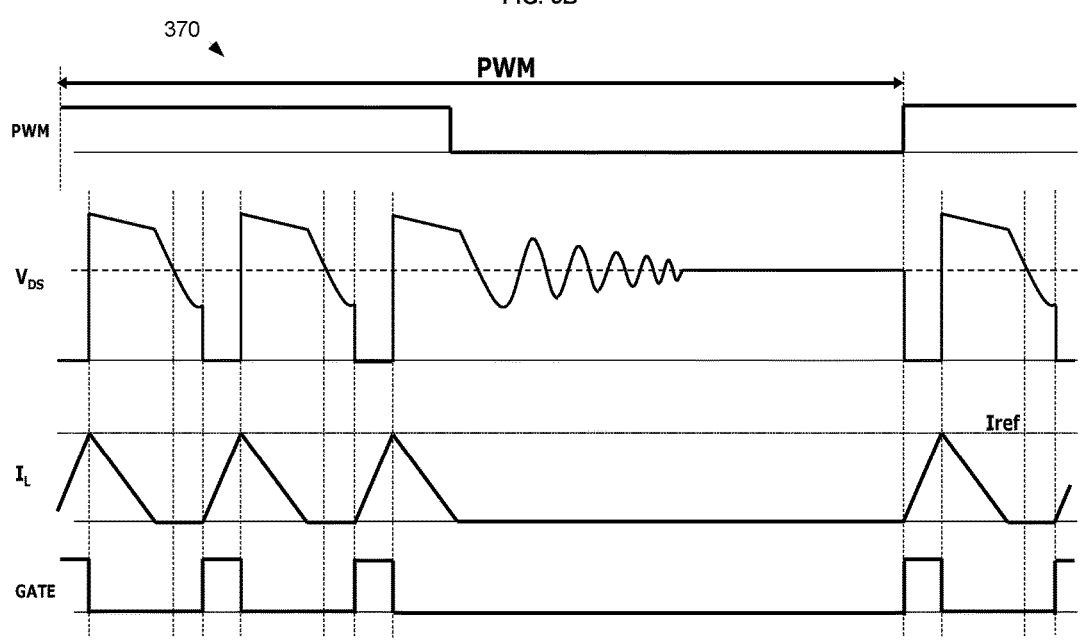

FIG. 3C illustrates various signals 370 within the driver circuitry 100 when the desired load current is at a low level to drive the LED lamp to a low level of brightness. The modulation signal PM has an ON-time of 10%. The reference current is set to twice the LED lamp's rated current. It can be seen that the multiple valleys are skipped and the frequency of the GATE signal has been significantly reduced, while the load current continues to reach the reference current on each cycle. Valley clamping as described above with reference to PDM embodiments may also be performed using the PWM signal.

In another embodiment, the modulation signal is a pulse frequency modulation (PFM) signal that is used to control the generation of the control signal as described above. The PFM signal is generated such that a frequency of pulses in the control signal controls the amount of current to be supplied to the load.

Figure 4:
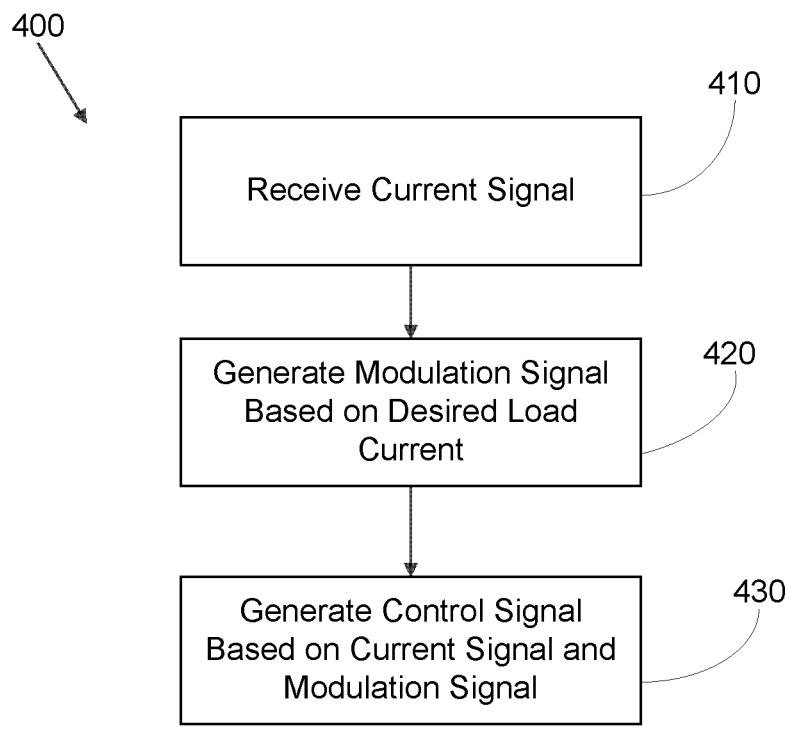
FIG. 4 illustrates one embodiment of a method that controls a switching device to supply a desired amount of current to a load.

FIG. 4 illustrates one embodiment of method 400 a method configured to perform modulated quasi-resonant peak current control of a switching device. The method 400 may be performed by any of the driver circuitries 100, 200, and/or 300 of FIGS. 1, 2, and 3, respectively. The method includes, at 410, receiving a current signal indicative of whether load current flowing through a load has reached a reference current. At 420, a modulation signal is generated having an ON-time that is based at least on a desired amount of current to be supplied to the load. The functions of 410 and 420 may be performed by modulation circuitry 130, 230, and/or 330 of FIGS. 1, 2, and/or 3, respectively. At 430, the method includes generating a control signal for a switching device that controls supply of current to the load based at least on the current signal and the modulation signal. The functions of 430 may be performed by signal generation circuitry 140, 240, and/or 340 of FIGS. 1, 2, and/or 3, respectively.

In one embodiment, the method includes receiving a valley detection signal indicating that the load current crosses zero. The method also includes generating a pulse to cause the switching device to operate an ON state in which current is supplied to the load by: generating a rising edge of the pulse when i) the modulation signal is high and ii) a first valley detection signal is received; and generating a falling edge of the pulse when the current signal indicates that the load current has reached the reference current.

In one embodiment, the method includes determining a value for the reference current based at least on an operating parameter of the load. The operation parameter may be a temperature of the load and/or a brightness produced by a light emitting diode at the reference current.

In one embodiment, the method includes generating the modulation signal having no less than a minimum frequency. In this embodiment, when the desired amount of current is less than the current that is supplied to the load to produce a modulation signal having the minimum frequency, the method includes generating the falling edge of the pulse prior to the when the current signal indicates that the load current has reached the reference current.

It can be seen from the foregoing description that the described driver circuitries employ modulated quasi-resonant peak-current-mode control for loads such as LED lamps. Use of a modulation signal to drive the switching device reduces losses and reduces electro-magnetic interference generated by the driver circuitry. Extremely low brightness may be produced in an LED lamp without allowing the switching frequency to fall within an audible range.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

Various illustrative logics, logical blocks, modules, circuitries, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

What is claimed is:

1. Driver circuitry configured to generate a control signal for a switching device that controls supply of load current to a load, the driver circuitry comprising:
    zero crossing detection circuitry configured to generate a valley detection signal when the load current crosses zero;
    current control circuitry configured to generate a current signal indicative of whether the load current has reached a reference current;
    modulation circuitry configured to generate a modulation signal having an ON-time that is based at least on a desired amount of current to be supplied to the load;

signal generation circuitry configured to generate the control signal including a pulse that causes the switching device to operate an ON state in which current is supplied to the load by:
  generating a rising edge of the pulse when i) the modulation signal is high and ii) a valley detection signal is received; and
  generating a falling edge of the pulse when the current signal indicates that the load current has reached the reference current.

2. The driver circuitry of claim 1, wherein the signal generation circuitry is configured to:
  generate
    the rising edge of the pulse when i) the modulation signal is high and ii) a first valley detection signal is received.

3. The driver circuitry of claim 1, wherein the current control circuitry comprises reference current control circuitry configured to determine the reference current based at least on an operating parameter of the load.

4. The driver circuitry of claim 3, wherein the operation parameter comprises a temperature of the load.

5. The driver circuitry of claim 3, wherein the load comprises a light emitting diode and the operating parameter comprises a brightness produced by the light emitting diode at the reference current.

6. The driver circuitry of claim 1, wherein the modulation circuitry is configured to generate the modulation signal having no less than a minimum frequency.

7. The driver circuitry of claim 6, wherein the modulation circuitry is configured to, when the desired amount of current is less than the current that is supplied to the load to produce a modulation signal having the minimum frequency, generate the falling edge of the pulse prior to the when the current signal indicates that the load current has reached the reference current.

8. The driver circuitry of claim 1, wherein the modulation signal comprises a pulse-density-modulation (PDM) signal in which a ratio of high pulses to low pulses in the control signal within a pulse period controls the amount of current to be supplied to the load.

9. The driver circuitry of claim 1, wherein the modulation signal comprises a pulse-width-modulation (PWM) signal in which a width of a pulse in the control signal relative to a pulse period controls the amount of current to be supplied to the load.

10. The driver circuitry of claim 1, wherein the modulation signal comprises a pulse-frequency-modulation (PFM) signal in which a frequency of pulses in the control signal controls the amount of current to be supplied to the load.

11. A method, comprising:
  receiving a current signal indicative of whether load current flowing through a load has reached a reference current;
  receiving a valley detection signal indicating that the load current crosses zero;
  generating a modulation signal having an ON-time that is based at least on a desired amount of current to be supplied to the load; and
  generating a control signal for a switching device that controls supply of current to the load, wherein the control signal includes a pulse to cause the switching device to operate an ON state in which current is supplied to the load, wherein generating the control signal includes:
    generating a rising edge of the pulse when i) the modulation signal is high and ii) a valley detection signal is received; and
    generating a falling edge of the pulse when the current signal indicates that the load current has reached the reference current.

12. The method of claim 11, further comprising:
  generating the rising edge of the pulse when i) the modulation signal is high and ii) a first valley detection signal is received.

13. The method of claim 11, further comprising determining a value for the reference current based at least on an operating parameter of the load.

14. The method of claim 13, wherein the operation parameter comprises a temperature of the load.

15. The method of claim 13, wherein the load comprises a light emitting diode and the operating parameter comprises a brightness produced by the light emitting diode at the reference current.

16. The method of claim 11, further comprising generating the modulation signal having no less than a minimum frequency.

17. The method of claim 16, further comprising, when the desired amount of current is less than the current that is supplied to the load to produce a modulation signal having the minimum frequency:
  generating the falling edge of the pulse prior to the when the current signal indicates that the load current has reached the reference current.

18. Driver circuitry configured to generate a control signal for a switching device that controls supply of load current to a load, the driver circuitry comprising:
  comparator circuitry configured to generate a current signal indicative of whether the load current has reached a reference current;
  brightness color control unit circuitry (BCCU) configured to generate a modulation signal having an ON-time that is based at least on a desired amount of current to be supplied to the load;
  capture and control unit circuitry (CCU) configured to generate the control signal based at least on the current signal and the modulation signal, wherein the CCU comprises a counter configured to:
    generate a rising edge of the control signal in response to counting a certain number of increments after a zero crossing of the load current is detected; and
    generate a falling edge of the control signal in response to a falling edge of the CCU signal.

19. The driver circuitry of claim 18, wherein the CCU is configured to generate a falling edge of the control signal upon expiration of a predetermined number of counts since a last FLUSH input that clears the CCU counter.

* * * * *